United States Patent [19]

Solak et al.

[11] Patent Number: 4,991,805
[45] Date of Patent: Feb. 12, 1991

[54] REFRIGERATOR GEAR DRIVEN LEVELING SYSTEM

[75] Inventors: Gregory P. Solak, Ohio Twp., Warrick County; Shelby A. Lynn, Johnson Twp., Gibson County, both of Ind.

[73] Assignee: Whirlpool Corporation, Benton Harbor, Mich.

[21] Appl. No.: 353,049

[22] Filed: May 17, 1989

[51] Int. Cl.⁵ .................................. F16M 00/00
[52] U.S. Cl. ............................ 248/188.4; 248/649; 312/255
[58] Field of Search ............... 248/188.4, 650, 188.2, 248/649; 74/423, 89.13; 312/255

[56] References Cited

U.S. PATENT DOCUMENTS

| 381,120 | 4/1888 | Devoy . | |
|---|---|---|---|
| 1,632,383 | 6/1927 | Seiden | 248/188.4 |
| 1,884,636 | 10/1932 | Faus | 248/188.4 |
| 2,803,510 | 8/1957 | Carbary . | |
| 2,853,732 | 9/1958 | Matter . | |
| 4,789,121 | 12/1988 | Gidseg et al. | 312/255 |

FOREIGN PATENT DOCUMENTS 2466221  4/1981  France ................. 248/188.4

Primary Examiner—James R. Brittain
Assistant Examiner—Gerald A. Anderson
Attorney, Agent, or Firm—Wood, Phillips, Mason, Recktenwald & Vansanten

[57] ABSTRACT

A refrigeration apparatus includes a cabinet having a base assembly including front and rear sections. A leveling system therefor comprises a pair of front leveling legs and a pair of rear leveling legs. Means are included for threadably mounting the front leveling legs to the base assembly at the front section. Gear means are provided for drivably mounting the rear leveling legs to the base assembly at the rear section. Remote drive means are operatively connected to the gear means and extend toward the base assembly front section whereby all leveling of the refrigeration apparatus can be adjusted from in front of the refrigeration apparatus.

10 Claims, 1 Drawing Sheet

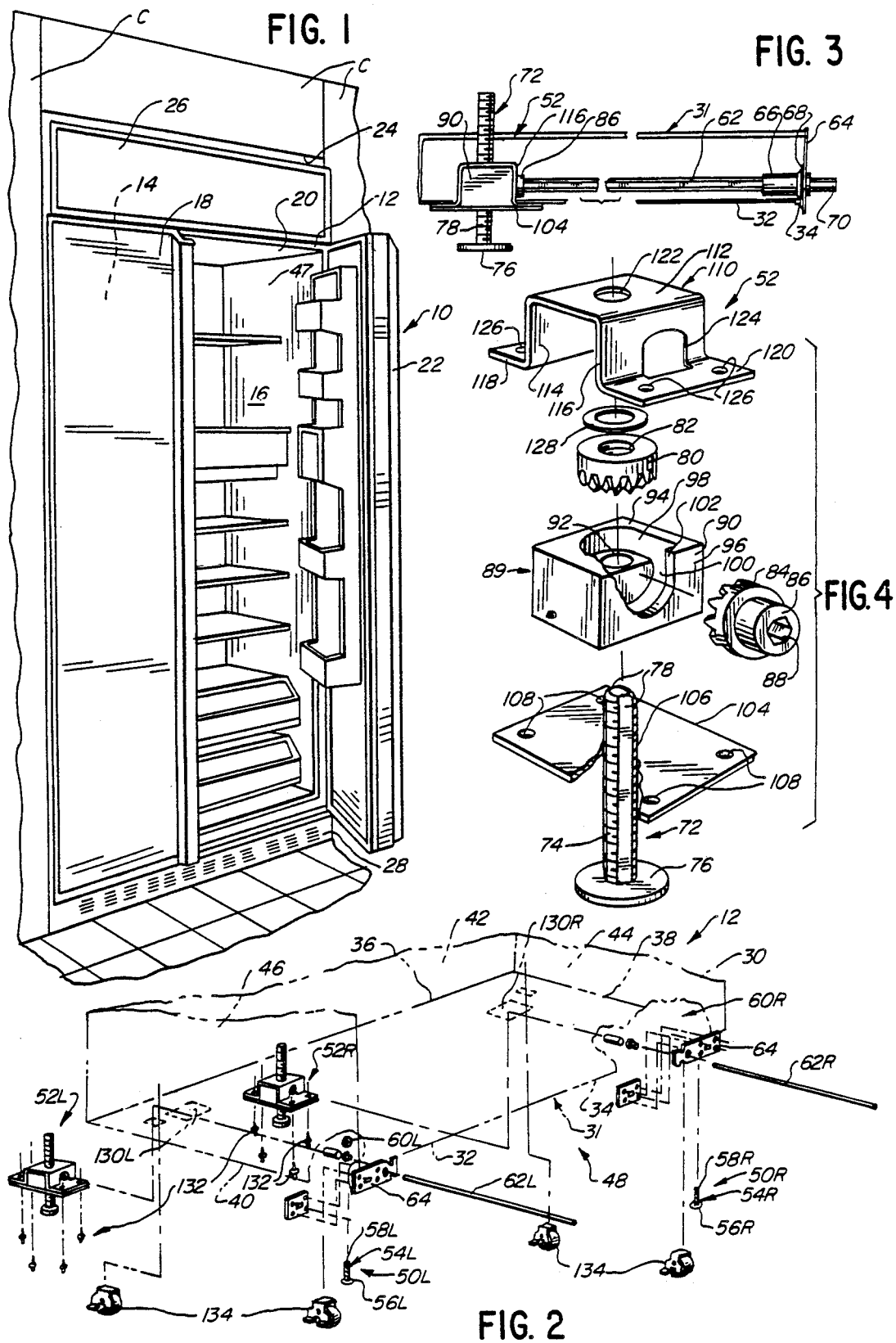

REFRIGERATOR GEAR DRIVEN LEVELING SYSTEM

BACKGROUND OF THE INVENTION

1. Field of the Invention

This invention relates generally to refrigerator cabinets and, more particularly, to an improved leveling system therefor.

2. Description of Background Art

A refrigerator conventionally includes a cabinet having a support frame or shell. Most refrigerators are intended to be free standing and to rest on a floor or other flat surface. Oftentimes the floor is not level, or there may be relative raised or lower portions of the floor at the position where the refrigerator cabinet is to be installed. Advantageously, the refrigerator cabinet should be mounted so that it is level.

The need for leveling a refrigerator cabinet is of particular importance when the cabinet comprises a built-in refrigerator cabinet. With a such built-in refrigerator cabinet, the unit is typically flush mounted with adjacent cabinets and must suitably fill in the space provided therefor. To do so, it may be necessary to adjust the height of the top of the cabinet so that it is spaced a desirable distance from superjacent cabinets or other structure.

Typical prior art leveling systems comprised a leveling leg adjustably fastened to the frame or shell. Particularly, the leveling leg included a leveling pad connected to a threaded rod. The frame was provided with a mated threading element into which the rod was threadably inserted. The leveling pad included suitably shaped body or other element engagable by a tool, such as a wrench, for causing rotation of the leveling pad. Rotation of the leveling pad results in adjusting the height at the location of the leveling leg owing to the threaded relationship between the threaded rod and the frame.

Generally, such a leveling leg is provided at each front and rear corner of the cabinet Adjustment of the front leveling legs is generally readily accomplished due to the close proximity between the leveling leg and the front of the cabinet The situation is not quite so simple with the rear leveling legs. With the cabinet installed in its intended position a long, open end wrench must be used to raise or lower the rear leveling legs. The installer must necessarily be in a prone position while awkwardly "fishing" for the rear leveling leg with a tool that is difficult to use. The difficulty of such adjustment increases with depth of the cabinet.

The present invention is intended to overcome one or more of the problems as set forth above, in a novel and simple manner.

SUMMARY OF THE INVENTION

In accordance with one aspect of the invention, a refrigerator apparatus is provided with a gear driven rear leveling leg.

Broadly, there is disclosed herein an improved leveling assembly for a refrigeration apparatus including drive means drivingly engaging a rear leveling leg for adjusting the rear leveling leg and remote means operatively connected to the drive means and extending towards a front portion of a cabinet for permitting leveling of the cabinet to be adjusted from in front of the refrigeration apparatus.

In one embodiment, the refrigeration apparatus includes a cabinet having a base assembly including front and rear sections. A leveling system therefor comprises a pair of front leveling legs and a pair of rear leveling legs. Means are included for threadably mounting the front leveling legs to the base assembly at the front section. Gear means are provided for drivably mounting the rear leveling legs to the base assembly at the rear section. Remote drive means are operatively connected to the gear means and extend toward the base assembly front section whereby all leveling of the refrigeration apparatus can be adjusted from in front of the refrigeration apparatus.

It is a feature of the invention that the gear means comprises a pair of engaged bevel gears.

It is another feature of the invention that the leveling leg cannot be directly adjusted except by the drive means.

It is a further feature of the invention that the drive means is adapted for being driven by a conventional tool.

It is still another feature of the invention that the refrigeration apparatus comprises a built-in refrigerator.

In an illustrative embodiment disclosed herein, a gear driven leveling assembly is provided for a free standing appliance. The appliance has a cabinet including a base assembly. The leveling assembly comprises a leveling leg including a leveling pad connected to a threaded rod. A first bevel gear includes a central threaded aperture therethrough receiving the threaded rod. A second bevel gear is mated with the first bevel gear, and means are fastenable to the cabinet bottom frame for retaining the bevel gears in intermeshed engagement with the leveling pad positioned therebelow. Means are operatively associated with the second bevel gear for driving the second bevel gear to adjust the spacing between the leveling pad and the first bevel gear.

In one aspect of the invention where the leveling assembly is provided remotely located on the appliance, an adjusting rod is engagable with the driving means and extends to a forward position of the appliance whereby actuation of the adjusting rod causes corresponding rotation of the second bevel gear to adjust the leveling of the appliance.

Further features and advantages of the invention will readily be apparent from the specification and from the drawings.

BRIEF DESCRIPTION OF THE DRAWINGS

FIG. 1 a perspective view of a built-in refrigerator having a leveling system embodying the invention;

FIG. 2 is a partially cut-away, exploded view of the bottom portion of the refrigerator cabinet of FIG. 1, with certain parts removed for clarity, specifically illustrating the installation of the leveling system;

FIG. 3 is a partially cut-away sectional view of the rear leveling system of FIG. 2; and FIG. 4 is an exploded view of the gear driven leveling assembly of FIG. 2.

DETAILED DESCRIPTION OF THE INVENTION

Referring to FIG. 1, a refrigeration apparatus, such as a refrigerator/freezer 10, includes a leveling system according to the present invention The invention is shown utilized with a built-in side-by-side refrigerator/freezer; however, other types of refrigeration apparatus may be used in conjunction with the leveling system of the present invention, as will be obvious to those skilled in the art.

The refrigerator/freezer 10 includes a cabinet 12 housing a below-freezing, or freezer, compartment 14 and a fresh food, or above-freezing, compartment 16 The freezer compartment 14 is accessible through an access opening (not shown). A freezer door 18 is provided for selectively closing the freezer access opening. Similarly, the fresh food compartment 16 includes an access opening 20 and a fresh food door 22 is provided for selectively closing the fresh food access opening 20.

As specifically illustrated in FIG. 1, the refrigerator/freezer 10 is adapted to be mounted flush with and immediately adjacent to cabinets C. The cabinets C are installed to provided a rectangular opening 24 for receiving the cabinet 12. A decorative grille assembly 26 is fastened to the top of the cabinet 12. Conventional refrigeration components, such as a compressor and condenser, not shown, are top mounted on the cabinet 12. Thus, the grille 26 serves to cover and fill in the space between the top of the cabinet 12 and adjacent cabinets C and to provide ventilation for the refrigerator components. A base cover 28 is fastened at the bottom of the cabinet 12 and is provided to hinder direct access to beneath the cabinet, and also to provide for additional ventilation, as is well known.

Referring also to FIG. 2, the refrigerator cabinet 12 includes a frame, which in the illustrated embodiment comprises a sheet metal shell 30 fastened to a base assembly, shown generally at 31. The base assembly 31 includes a flat plate 32 having respective front and rear marginal edges 34 and 36 and side edges 38 and 40. A shell rear wall 42 is connected to the rear marginal edge 36 of the plate 32 and also to opposite shell side walls 44 and 46.

As is well known, a conventional cabinet liner 47, see FIG. 1, may be inserted within the shell 30 and a suitable insulation foamed between the liner 47 and the shell 30 to provide insulation and add strength and rigidity to the cabinet 12.

The cabinet 12 is provided with a leveling system generally indicated at 48. The leveling system 48 includes left and right front leveling assemblies 50-L and 50-R and left and right rear leveling assemblies 52-L and 52-R.

For both the front and rear leveling assemblies, the left and right elements are identical in construction. Therefore, for simplicity herein, the particular elements will be referred to with reference numerals not including the suffix L or R, it being understood that the suffix L or R in the drawing refers to the respective left and right assembly elements.

Each front leveling assembly 50 includes a leveling leg 54 comprising a leveling pad 56 connected to a threaded rod 58. The threaded rod 58 is threadably received in a push on threaded retainer nut 60 which is fastened to the base assembly plate 32 in a conventional manner. Resultantly, adjustment of the front of the cabinet can be accomplished by rotating the leveling leg 54 using a conventional tool as required.

Referring also to FIG. 3, the rear leveling assembly 52 is operatively connected to an adjusting rod 62. The adjusting rod extends forwardly relative to the cabinet and extends through an opening in a front support bracket 64 which fastens to the base assembly 31 adjacent the plate front marginal edge 34. A retainer sleeve 66 and bushing 68 maintain the adjusting rod 62 in a desired position and permit rotation thereof. An outer end 70 of the adjusting rod 62 extends forwardly of the bracket 64 and is advantageously hexagonal in cross section for engagement with a wrench or socket and ratchet.

Referring now to FIG. 4, the rear leveling assembly 52 includes a leveling leg 72 having a threaded rod 74 connected to a leveling pad 76. The threaded rod 74 is generally cylindrical but includes opposite flattened edges 78 for reasons discuss below.

A first bevel gear 80 includes a central threaded opening 82. The opening 82 is threaded to receive the threaded rod 78. A second bevel gear 84, matable with the first bevel gear 80, includes an actually extending sleeve 86 including a hexagon shaped opening 88. The opening 88 is of a size and shape for receiving the adjusting rod 62.

A gear housing 89 comprise a generally cube-shaped solid block 90 including a central bore 92 therethrough of a size and shape for receiving the threaded rod 78. Specifically, the opening 92 is large enough to permit free axial movement of the threaded rod 78 yet small enough to prevent rotational movement of the threaded rod 78. The block 91 includes a top wall 94 joined by a front wall 96. A partial U-shaped bore 98 is provided through the top wall 94 and joins a partial U-shaped bore 100 through the front wall 96. A shoulder 102 is provided at the front bore 100.

A gear mounting bracket is of two-piece construction and includes a top plate 110 and a bottom plate 104. The bottom plate 104 comprises a rectangular flat steel plate including a central circular aperture 106, and a smaller screw receiving aperture 108 adjacent each corner. The top plate 110 is shaped to include a top wall 112 connected to downwardly turned front and rear walls 114 and 116 connected to outwardly turned front and rear flanges 118 and 120, respectively. The height of the walls 114 and 116, and the spacing therebetween corresponds to the shape of the block 90. A central circular aperture 122 is provided through the front wall 112. A U-shaped aperture 124 is provided through the front wall 116. Suitable screw receiving apertures 126 are provided through each flange 118 and 120 at the outer corners thereof.

In assembling the rear leveling assembly 52, the leveling leg 72 is placed so that the threaded rod 78 extends upwardly through the bottom plate central aperture 106. The gear housing 90 is installed by placing it atop the bottom plate 104 with the central aperture 92 receiving the threaded rod 78. The second bevel gear is inserted into the front wall U-shaped bore 100 with the gear 84 resting inside of the shoulder 102 and the sleeve 86 extending outwardly beyond the front wall 96. The first bevel gear, with the gear teeth pointing toward the block 90, is threaded onto the threaded rod 78 until it intermeshes with the second bevel gear 84. A nylon washer 128 is placed on top of the first bevel gear 80 and the top bracket 110 is placed atop the block 90 with the U-shaped opening 124 aligned so that the second gear sleeve 86 extends outwardly therefrom, as is illustrated in FIG. 3, and the openings 126 aligned with the bottom plate openings 108. Although not shown, a lubricating material such as, for example, teflon tape, may be adhered to the underside of the bracket top wall 112 to contact the nylon washer 128 to provide relatively free movement thereof by lessening friction.

Each rear leveling assembly 52 is fastened to the bottom frame assembly 31 by inserting it upwardly through an opening 130 in the plate 32 and securing it with screws 132 inserted through the aligned bottom and top plate openings 108 and 126 and threaded into the plate 32.

Operation of the rear leveling assembly 52 is as follows. When a tool such as a wrench or socket and ratchet is placed over the adjusting rod forward end 70, and the tool is turned, causing rotation of the adjusting rod 62, engagement between the adjusting rod 62 and the mated bevel gear aperture 88 causes similar rotation of the second bevel gear 84, which drives the first bevel gear 80. More specifically, clockwise rotation of the adjusting rod 62 provides counterclockwise rotation of the first bevel gear 80, looking downwardly, which increases the distance from the foot of the leveling pad 76 to the gear housing 89. Conversely, counterclockwise rotation of the adjusting rod 62 causes clockwise rotation of the first bevel gear 80 to decrease the distance from the foot of the leveling pad 76 to the gear housing 89.

Referring more particularly to FIG. 2, plurality of casters 134 are mounted in any known manner to the base assembly 31. Initially, the front leveling assemblies 50 and rear leveling assemblies 52 are at their uppermost position to permit the cabinet 12 to be rolled into position using the casters 134. An installer, or other user, by removing the base cover 28 obtains access to the leveling assemblies 50 and 52. Once the refrigerator is in position, then the front leveling assemblies 50 are adjusted as discussed above in the conventional manner. Using a suitable tool, as discussed above, each of the adjusting rods 62-L and 62-R is rotated in the clockwise direction until the leveling pad 78 comes in contact with the floor. Continued rotation causes a particular rear corner of the cabinet 12 to be raised to further space the cabinet 12 from the floor. If it is necessary to decrease the space from the cabinet 12 to the floor, then the adjusting rod 62 is rotated in the counterclockwise direction, as discussed above.

Otherwise, all of the leveling assemblies 50-L, 50-R, 52-L and 52-R can be adjusted as necessary or desired to provide leveling of the cabinet, or to raise the cabinet to a desired height to fill in the opening 24 provided in the cabinets C.

Although in the illustrated embodiment the remotely driven leveling assemblies 52 are shown as being rear mounted, similar such leveling assemblies could be front mounted at the cabinet utilizing a shorter adjusting rod 62. Also, if the leveling assembly 52 were closely spaced from the front of the cabinet, then an adjusting rod could be eliminated and a user could cause rotation of the second bevel gear 62 using a conventional Allen-type wrench. Also, the second bevel gear could be provided with a slotted or other shaped opening for receiving any of the known types of screwdrivers or other tools.

Thus, the invention broadly comprehends a gear driven, remotely positioned leveling assembly for an appliance.

We claim:

1. In a refrigeration apparatus including a cabinet having front leveling legs adjacent a front portion of said cabinet and rear leveling legs adjacent a rear portion of said cabinet, the improvement comprising:
   a generally cylindrical threaded rod connected to each rear leveling leg and having a flattened edge;
   a pair of blocks each including a bore therethrough being of a size and shape for receiving said threaded rod, to thereby permit axial movement but to prevent rotational movement of the threaded rod;
   drive means drivingly engaging said rear leveling legs for adjusting said rear leveling legs comprising a first bevel gear including a central threaded opening threadably received on each said threaded rod adjacent a top portion of said block and a second bevel gear mated with each said first bevel gear so that rotation of said second bevel gear causes rotation of said first bevel gear to provide axial movement of said threaded rod to level the cabinet; and
   remote means operatively connected to said second bevel gear to provide rotation thereof and extending toward the front portion of said cabinet for permitting leveling of the cabinet to be adjusted from in front of the refrigeration apparatus.

2. The improvement of claim 1 wherein said remote means comprises an elongated rod drivingly engaging said second bevel gear.

3. In a refrigeration apparatus including a cabinet having a base assembly including front and rear sections, a leveling system comprising:
   a pair of front leveling legs;
   means threadably mounting said front leveling legs to said base assembly at said front section;
   a pair of rear leveling legs;
   a generally cylindrical threaded rod connected to each rear leveling leg and having a flattened edge;
   a pair of blocks fastened at the rear section of the cabinet each including a bore therethrough being of a size and shape for receiving one said threaded rod, to thereby permit axial movement but to prevent rotational movement of the threaded rod;
   gear means for drivingly, adjustably positioning said rear leveling legs relative to said base assembly comprising a first bevel gear including a central threaded opening threadably received on each said threaded rod adjacent a top portion of said block and a second bevel gear mated with each said first bevel gear so that rotation of either said second bevel gear causes rotation of its mated said first bevel gear to provide axial movement of said threaded rod to level the cabinet; and
   drive means operatively connected to said gear means and extending toward the front section of said base assembly for driving said gear means whereby all leveling of the refrigeration apparatus can be adjusted from in front of the refrigeration apparatus.

4. The leveling system of claim 3 wherein said gear means includes a drive receptacle in said second bevel gear and said drive means comprises an elongated rod received in said receptacle for driving said gear means.

5. A built-in refrigeration apparatus comprising:
   a cabinet having a base assembly including a flat plate having front and rear marginal edges;
   a pair of front leveling legs;
   means threadably mounting said front leveling legs to said base assembly adjacent said front marginal edge for adjusting the height at a front portion of said cabinet;
   a pair of rear leveling legs;
   a generally cylindrical threaded rod connected to each rear leveling leg and having a flattened edge;
   a pair of gear drive assemblies drivingly, adjustably mounting said rear leveling legs to said base assembly adjacent said rear marginal edge for adjusting the height at a rear portion of said cabinet comprising a pair of blocks mounted at the rear marginal edge each including a bore therethrough being of a size and shape for receiving one said threaded rod, to thereby permit axial movement but to prevent rotational movement of the threaded rod, and a first bevel gear including a central threaded opening threadably received on each said threaded rod adjacent a top portion of said block and a second bevel gear mated with each said first bevel gear so that rotation of either second bevel gear causes rotation of its mated said first bevel gear to provide axial movement of said threaded rod to level the cabinet; and a pair of elongated rods each operatively connected to one of said gear drive assemblies and extending forwardly of the front marginal edge of said base assembly plate for driving said gear drive assemblies whereby all leveling of the refrigeration apparatus can be adjusted from in front of the refrigeration apparatus.

6. The built-in refrigeration apparatus of claim 5 wherein each said second bevel gear includes a drive receptacle and wherein each said rod is received in one of said receptacles for driving said gear drive assembly.

7. A gear driven leveling assembly for a free standing appliance having a cabinet including a bottom frame, comprising:

a leveling leg including a leveling pad connected to a threaded rod, the threaded rod including a flattened edge;

a first bevel gear including a central threaded aperture therethrough receiving said threaded rod;

a second bevel gear matable with said first bevel gear;

means fastenable to the cabinet bottom frame for retaining said bevel gears in intermeshed engagement with said leveling pad positioned therebelow and comprising a block having a bore therethrough being of a size and shape for receiving said threaded rod, to thereby permit axial movement but to prevent rotational movement of the threaded rod; and means operatively associated with said second bevel gear for rotatingly driving said second bevel gear to adjust the space between said leveling pad and said first bevel gear.

8. The leveling assembly of claim 7 further comprising lubricating means disposed between said first bevel gear and said retaining means for providing relatively friction free rotation of said first bevel gear.

9. The leveling assembly of claim 7 wherein said retaining means comprises a gear housing supporting said gears in association with said block.

10. The leveling assembly of claim 7 wherein said driving means comprises a hexagonal bore in said second bevel gear for receiving a hexagonal drive rod.

* * * * *